July 25, 1933.  E. P. TEEL  1,920,134

GEAR OILING SYSTEM FOR MULTIPLE CYLINDER INTERNAL COMBUSTION ENGINES

Filed Dec. 31, 1930  2 Sheets-Sheet 1

INVENTOR
Eric P. Teel
BY
Chappell and Earl
ATTORNEY

July 25, 1933.  E. P. TEEL  1,920,134
GEAR OILING SYSTEM FOR MULTIPLE CYLINDER INTERNAL COMBUSTION ENGINES
Filed Dec. 31, 1930  2 Sheets-Sheet 2

INVENTOR
Eric P. Teel
BY
Chappell and Earl
ATTORNEY

Patented July 25, 1933

1,920,134

UNITED STATES PATENT OFFICE

ERIC. P. TEEL, OF LANSING, MICHIGAN, ASSIGNOR TO NOVO ENGINE COMPANY, OF LANSING, MICHIGAN

GEAR OILING SYSTEM FOR MULTIPLE CYLINDER INTERNAL COMBUSTION ENGINES

Application filed December 31, 1930. Serial No. 505,792.

The objects of the invention are:

First, to provide such a gear means to deliver an effective supply of lubricant to the crank shaft piston rod bearings.

Second, to provide such a gear with means for properly proportioning the amount of oil used.

Third, to provide an improved construction and form of gear ring for this purpose and means for supporting the same.

Objects pertaining to details and economies of construction and operation will appear from the description to follow. A preferred embodiment of my invention is illustrated in the accompanying drawings, in which.

Figure 1:
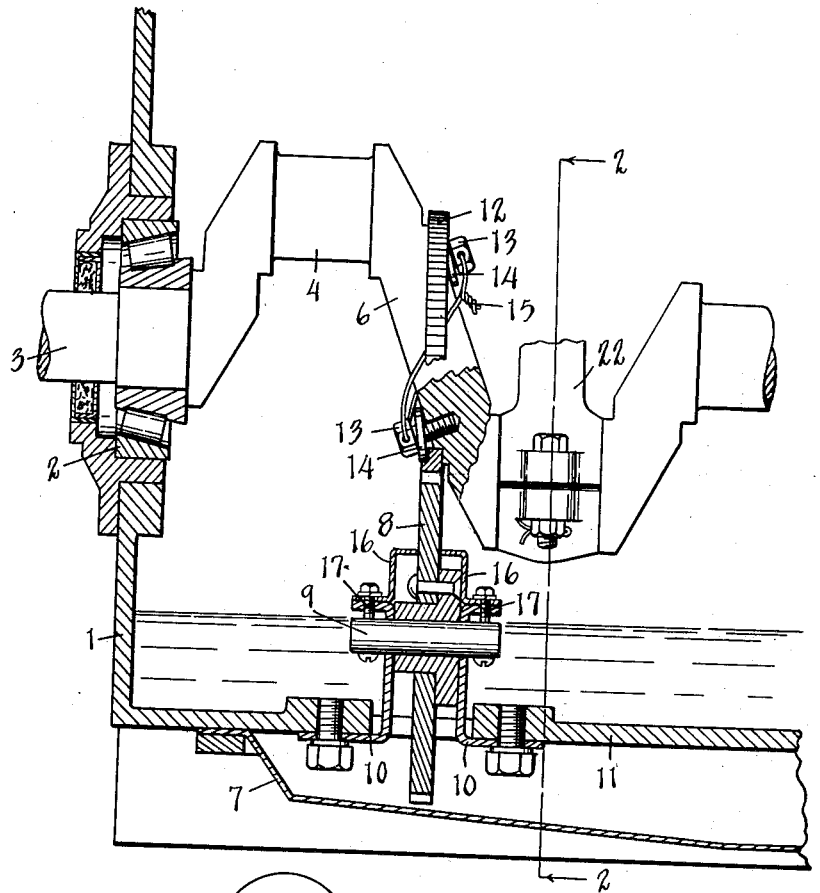
Fig. 1 is a detail elevation view, partly in section, on the irregular line 1—1 of Fig. 2 through the crank case and crank shaft of a multiple cylinder internal combustion engine.

The parts will be identified by their numerals of reference which are the same in all the views.

1 is the crank case of an engine. 2 is one of the roller bearings for the crank shaft. 3 is a fragment of the crank shaft showing two of the crank pins 4, 5 connected by the common crank arm 6. 22 is a portion of the connecting rod showing the bearing attached to crank pin 5. 7 is the detachable pan on the bottom of the crank case. 8 is a lubricator gear journaled on pin 9 which is carried by bracket 10 secured to the bottom flange 11 of the crank case, running partially submerged in oil, as indicated.

12 is an intermeshing gear ring meshing with the gear 8 which surrounds the crank arm 6 and is retained by screws 13 engaging retainer washers 14 which clamp the said ring gear 12 securely in place on said crank arm 6 in alignment with an in mesh with the gear 8. The screws are locked against displacement by being transversely perforated and joined together by a wire 15 as shown.

To limit the amount of oil carried by the gear 8, guards 16 are provided through which the gear runs. These guards are preferably of sheet metal, but can be of any suitable material. These guards are in the nature of scrapers and remove oil from the sides of the gears so that oil between the teeth of the gear 8 is practically the only oil thrown out by the meshing of the gears 8 and 12. These guards are fastened to the bracket 10 by bolts 17 and have a portion 18 to prevent needless throwing of the oil.

Figure 3:
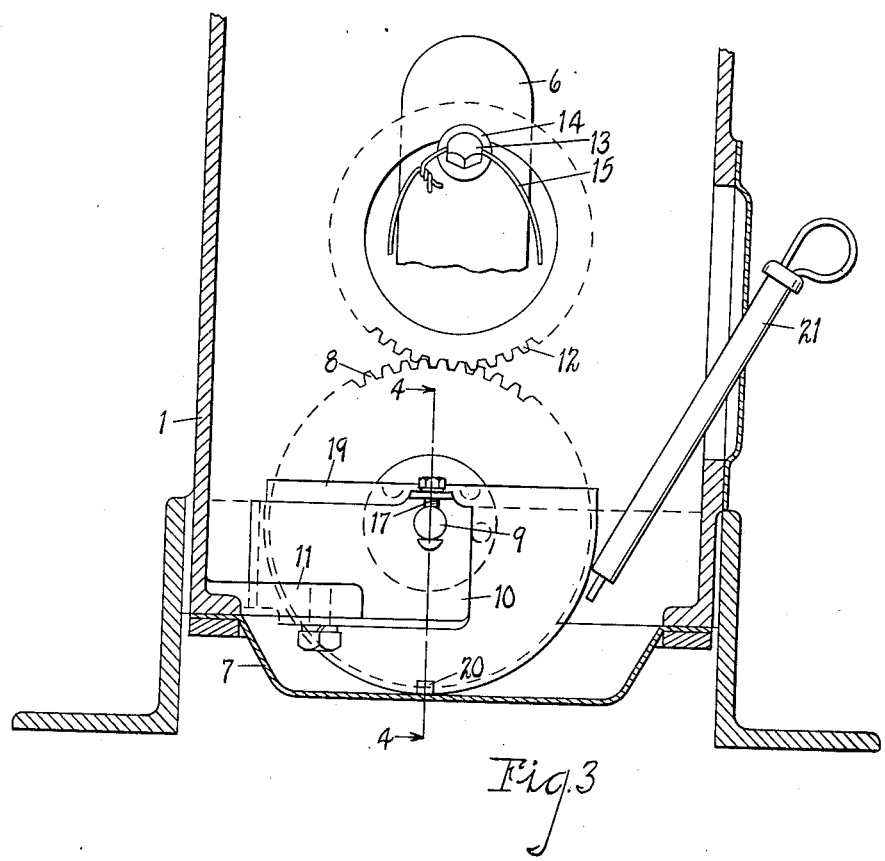
Fig. 3 is a detail elevational view partly in section showing a variation of the device.
Figure 4:
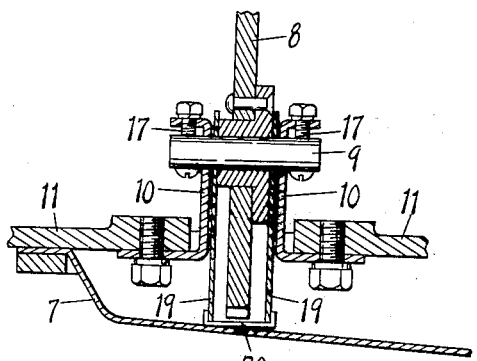
Fig. 4 is a detail sectional view on line 4—4 of Fig. 3.

In Figs. 3 and 4 a modification of the device for limiting the amount of oil delivered by gear 8 is shown. In this modification plates 19 are placed on each side of the gear 8 to form a bottomless trough through which the gear 8 rotates. These plates 19 extend above the oil level and are fastened between the bracket 10 and the gear 8 in close proximity to the gear 8 so as to limit the amount of oil that can be picked up by gear 8. The guards 19 are braced by fastener 20 at their bottom portion. In Fig. 3 there is also shown a conventional oil gauge 21.

In operation, as the crank shaft 3 turns over, it drives gear ring 12, which meshes with the gear 8 and causes it to carry oil up from the bottom of the crank case. The comparatively thick oil is shot out laterally at the intermeshing point of the gears which is opposite the crank pins 4 and 5, and the connecting rod bearings 22. The oil is sprayed on the connecting rod where it works into the openings on the sides and ends of the connecting rod bearings to oil the pins. The connecting rods are consequently struck with jets of oil sufficient to insure their complete and effective lubrication.

The lubrication is accomplished solely by the squirting of the oil caused by the meshing of the gears 8 and 12. Since the oil level is below the lowest point of the arc of the crank pin or connecting rod and connecting rod bearing, no oiling is effected by the striking of the connecting rod in the oil. This makes it possible to limit the amount of oil utilized.

Figure 2:
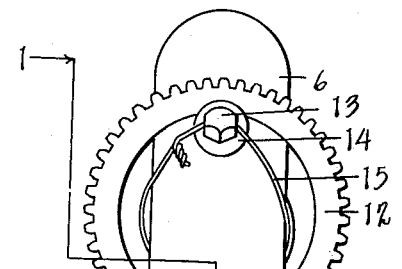
Fig. 2 is a detail sectional view on line 2—2 of Fig. 1, omitting the connecting rod and bearing to more clearly illustrate the construction.

In the structure shown in Figs. 1 and 2, the gear 8 revolves between guards 16 which are close to the gear and have a scraping action, so that the only oil carried by the gear 8 is between its teeth, thus assuring a limited amount of oil.

Using the modification shown in Figs. 3 and 4, the plates 19 form a restricted bottomless trough that limits the amount of oil contacting with gear 8 and thus limits the amount of oil carried up to the meshing of the gears 8 and 12.

I have shown a particular means for supporting these gears in place which is very economical and effective. I have also shown means for limiting the amount of oil fed by the gears. I desire to claim these specifically and also broadly as pointed out in the appended claims.

Having thus described my invention, what I claim as new and desire to secure by Letters Patent is:

1. The combination with a crank shaft of a multiple cylinder engine of a lubricating spur gear disposed and supported within the crank case and partially submerged in the oil, and a spur gear ring secured to an intermediate crank arm and disposed to mesh with said lubricating spur gear, the meshing point being disposed in proximity to a crank pin bearing whereby oil will be projected to the said bearing.

2. The combination with a crank shaft of a multiple cylinder engine, of a lubricating gear disposed and supported within the crank case and partially submerged in oil, a gear ring secured to an intermediate crank arm and disposed to mesh with said lubricating gear, and guards disposed to remove excess of oil from the sides of said lubricating gear.

3. The combination with a crank shaft of a multiple cylinder engine, of a lubricating gear disposed and supported within the crank case and partially submerged in oil, a gear ring secured to an intermediate crank arm and disposed to mesh with said lubricating gear, the meshing point being disposed in proximity to the crank pins and means for limiting the amount of oil picked up by said lubricating gear.

4. The combination with a crank shaft of a multiple cylinder engine, of a lubricating gear disposed and supported within the crank case and partially submerged in oil, a gear ring secured to an intermediate crank arm and disposed to mesh with said lubricating gear, the meshing point being disposed in proximity to the crank pins and means for limiting the amount of oil picked up by said lubricating gear.

5. The combination with a crank shaft of a multiple cylinder engine, of a lubricating spur gear disposed and supported within the crank case and partially submerged in oil, a spur gear ring secured to an intermediate crank arm and disposed to mesh with said lubricating spur gear, the meshing point being disposed in proximity to the crank pins.

6. The combination with a crank shaft for a multiple cylinder engine of a lubricating spur gear, brackets therefor secured to the base flange of the crank case, a spur gear ring meshing therewith and disposed centrally and surrounding an intermediate arm between crank pins, the meshing point being disposed in proximity to said pins, said spur gear ring being retained in place by clamping screws and washers on opposite sides thereof, and means for locking the clamp screws in place.

ERIC. P. TEEL.